US 11,205,088 B2

United States Patent
Chen et al.

(10) Patent No.: US 11,205,088 B2
(45) Date of Patent: Dec. 21, 2021

(54) METHOD AND APPARATUS FOR CALCULATING A LUMINANCE VALUE OF A REGION OF INTEREST

(71) Applicant: Hangzhou Hikvision Digital Technology Co., Ltd., Zheijiang (CN)

(72) Inventors: Lei Chen, Zhejiang (CN); Gang Liu, Zhejiang (CN); Feng Zeng, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 69 days.

(21) Appl. No.: 16/616,056

(22) PCT Filed: Apr. 12, 2019

(86) PCT No.: PCT/CN2019/082523
§ 371 (c)(1),
(2) Date: Nov. 22, 2019

(87) PCT Pub. No.: WO2019/218823
PCT Pub. Date: Nov. 21, 2019

(65) Prior Publication Data
US 2021/0150251 A1  May 20, 2021

(30) Foreign Application Priority Data

May 18, 2018  (CN) .......................... 201810481113.6

(51) Int. Cl.
*G06K 9/46* (2006.01)
*G06T 7/73* (2017.01)
(Continued)

(52) U.S. Cl.
CPC ....... *G06K 9/4661* (2013.01); *G06K 9/00221* (2013.01); *G06K 9/00711* (2013.01);
(Continued)

(58) Field of Classification Search
CPC combination set(s) only.
See application file for complete search history.

(56) References Cited

U.S. PATENT DOCUMENTS

2006/0126903 A1\* 6/2006 Sharony ................ G06T 7/0012
382/110
2008/0074496 A1\* 3/2008 Venetianer ....... G08B 13/19602
348/150
(Continued)

FOREIGN PATENT DOCUMENTS

CN  101521749 A  9/2009
CN  101848327 A  9/2010
(Continued)

OTHER PUBLICATIONS

Xiaochen Hu, "Face Image Illumination Quality Assessment for Surveillance Video Using KPLSR"—2016 International Conference on Progress in Informatics and Computing (PIC); doi: 10.1109/PIC.2016.7949520;Published: Jun. 19, 2017, pp. 330-333.\*
(Continued)

*Primary Examiner* — Omar S Ismail
(74) *Attorney, Agent, or Firm* — Meunier Carlin & Curfman LLC (57) ABSTRACT

Embodiment of the present application provides a method and an apparatus for calculating a luminance value of a region of interest. The method includes: determining a region of interest where an object of interest is located in a current video frame, and determining a state of the object of interest; dividing the region of interest into a preset number of sub-region blocks, and obtaining a luminance value of each of the sub-region blocks; determining a weight for the luminance value of each of the sub-region blocks in the region of interest according to correspondences between preset states of the object of interest and weights for luminance values of the sub-region blocks in the region of
(Continued)

interest, and the state of the object of interest; wherein, a preset state of the object of interest corresponds to the preset number of weights for luminance values; and integrating luminance values of the sub-region blocks in the region of interest according to the weights for luminance values of the sub-region blocks to obtain the luminance value of the region of interest. With the solution provided by embodiments of the present application, the luminance value of the region of interest where the object of interest is located can be obtained with increased accuracy.

13 Claims, 3 Drawing Sheets

(51) Int. Cl.
  *G06T 7/20* (2017.01)
  *G06K 9/00* (2006.01)
  *G06K 9/20* (2006.01)
(52) U.S. Cl.
  CPC .............. *G06K 9/2027* (2013.01); *G06T 7/20* (2013.01); *G06T 7/74* (2017.01); *G06K 9/00771* (2013.01); *G06T 2207/10016* (2013.01); *G06T 2207/20021* (2013.01)

(56) References Cited

U.S. PATENT DOCUMENTS

| | | | | |
|---|---|---|---|---|
| 2009/0060290 | A1* | 3/2009 | Sabe | G06K 9/00248 382/118 |
| 2009/0285452 | A1* | 11/2009 | Liang | G16H 40/67 382/110 |
| 2011/0182520 | A1* | 7/2011 | Free | G06T 7/75 382/195 |
| 2014/0016868 | A1 | 1/2014 | Xuan et al. | |
| 2014/0218520 | A1* | 8/2014 | Teich | H04N 5/2354 348/143 |
| 2015/0186711 | A1* | 7/2015 | Baldwin | G06F 21/32 382/118 |
| 2015/0378433 | A1* | 12/2015 | Savastinuk | G06F 21/32 345/156 |
| 2016/0379061 | A1* | 12/2016 | Zhang | G06K 9/00778 382/103 |
| 2017/0112382 | A1* | 4/2017 | Nakata | A61B 5/0245 |
| 2017/0374261 | A1* | 12/2017 | Teich | H04N 5/2354 |

FOREIGN PATENT DOCUMENTS

| | | |
|---|---|---|
| CN | 102354388 A | 2/2012 |
| CN | 106506982 A | 3/2017 |
| JP | 2009239792 A | 10/2009 |

OTHER PUBLICATIONS

Junyong You.,"A Multiple Visual Models Based Perceptive Analysis Framework for Multilevel Video Summarization", IEEE Transactions on Circuits and Systems for Video Technology, vol. 17, No. 3, Mar. 2007, pp. 273-282.*
M. Ali Akber Dewan,"Adaptive appearance model tracking for still-to-video face recognition", Pattern Recognition 49(2016)129-151, pp. 129-135.*
Christian Küblbeck,"Face detection and tracking in video sequences using the modified census transformation," Image and Vision Computing 24 (2006) 564-572, Aug. 23, 2005, pp. 564-569.*
Md. Abdur Rahim,"Face Recognition using Local Binary Patterns (LBP)", Global Journal of Computer Science and Technology Graphics & Vision, vol. 13 Issue 4 Version 1.0 Year 2013,pp. 2-6.*
First Office Action issued in corresponding China Application No. 201810481113.6, dated Mar. 27, 2020, 6 pages.
International Search Report and Written Opinion, issued in corresponding international application No. PCT/CN2019/082523, dated Jul. 11, 2019.

* cited by examiner

METHOD AND APPARATUS FOR CALCULATING A LUMINANCE VALUE OF A REGION OF INTEREST

The present application claims the priority to PCT International Application No. PCT/CN2019/082523, filed Apr. 12, 2019, which claims priority to Chinese patent application No. 201810481113.6, filed with the China National Intellectual Property Administration on May 18, 2018 and entitled "A method and an apparatus for calculating a luminance value of a region of interest", which are each incorporated herein by reference in its entirety.

TECHNICAL FIELD

The application relates to the field of image processing technology, and in particular, to a method and apparatus for calculating a luminance value of a region of interest.

BACKGROUND

Exposure can be adjusted through an aperture, shutter, gain and the like such that an image has proper and desired luminance. In case of great change in ambient luminance (for example, from front lighting to backlighting, or conversely), the overall luminance of an image may not change much, but the luminance of a region of interest in the image may change greatly. This is unfavorable for identification of objects in the image and subsequent data analysis. Adjustment of exposure parameters is thus required to adapt and keep the luminance of the region of interest within a proper luminance range under different lighting conditions.

An example of face-based video surveillance is provided below.

For face-based video surveillance, a human face is taken as an object of interest in the video frame, and a region containing a human face is taken as a region of interest. Exposure parameters of the video frame can be adjusted to adjust the luminance of the face-containing region, i.e., face exposure. There may be more than one regions of interest in a video frame. At present, for a human exposure, the luminance values of all the regions of interest containing an object of interest are required. However, in practice, a human face in a region of interest may be in various states. For example, a front face, or various types of side faces may be shown in the region of interest. In case of a side face, in process of acquiring the luminance values of the regions of interest, the luminance of a non-face region may also be counted. This may provide inaccurate luminance value of a region of interest.

SUMMARY

Embodiments of the application provide a method and apparatus for calculating a luminance value of a region of interest, an electronic device, and a computer readable storage medium. The accuracy of the luminance value of a region of interest where the object of interest is located can be improved. Specifically, the technical solutions are as follows.

In the first aspect, embodiments of the application provide a method for calculating a luminance value of a region of interest. The method includes:

determining a region of interest where an object of interest is located in a current video frame, and determining a state of the object of interest;

dividing the region of interest into a preset number of sub-region blocks, and obtaining a luminance value of each of the sub-region blocks;

determining a weight for the luminance value of each of the sub-region blocks in the region of interest according to correspondences between preset states of the object of interest and weights for luminance values of the sub-region blocks in the region of interest, and the state of the object of interest; wherein, a preset state of the object of interest corresponds to the preset number of weights for luminance values; and integrating luminance values of the sub-region blocks in the region of interest according to the weights for luminance values of the sub-region blocks to obtain the luminance value of the region of interest.

In the second aspect, embodiments of the application provide an apparatus for calculating a luminance value of a region of interest. The apparatus includes:

a first determining module configured for determining a region of interest where an object of interest is located in a current video frame, and determining a state of the object of interest;

an obtaining module configured for dividing the region of interest into a preset number of sub-region blocks, and obtaining a luminance value of each of the sub-region blocks;

a second determining module configured for determining a weight for the luminance value of each of the sub-region blocks in the region of interest according to correspondences between preset states of the object of interest and weights for luminance values of the sub-region blocks in the region of interest, and the state of the object of interest; wherein, a preset state of the object of interest corresponds to the preset number of weights for luminance values; and an integrating module, configured for integrating luminance values of the sub-region blocks in the region of interest according to the weights for luminance values of the sub-region blocks to obtain the luminance value of the region of interest.

In the solution provided by embodiments of the present application, a region of interest where an object of interest is located in a current video frame and a state of the object of interest are determined; the region of interest is divided into a preset number of sub-region blocks, and a luminance value of each of the sub-region blocks is obtained; a weight for the luminance value of each of the sub-region blocks in the region of interest is determined according to the state of the object of interest; and luminance values of the sub-region blocks in the region of interest are integrated according to the weights for luminance values of the sub-region blocks to obtain the luminance value of the region of interest. It can be seen that, in the solution provided by embodiments of the present application, the state of the object of interest corresponding to the region of interest is considered, the region of interest is divided into several sub-region blocks, and a luminance weight value is assigned to each of the sub-region blocks based on the state of the object of interest. This produces more accurate calculated luminance value of the region of interest

BRIEF DESCRIPTION OF THE DRAWINGS

In order to more clearly describe the technical solution of the embodiments of the application or of the prior art, drawings needed in the embodiments and the prior art will be briefly described below. Obviously, the drawings described below are for only some embodiments of the present application, one of ordinary skills in the art can also obtain other drawings based on these drawings without any creative efforts.

FIG. 4 is a diagram illustrating luminance weight values of sub-region blocks in the region of interest corresponding to a face in different states according to an embodiment of the present application, wherein FIG. 4(a) illustrates luminance weight values of the sub-region blocks for a left side face, FIG. 4(b) illustrates luminance weight values of sub-region blocks for right side face, FIG. 4(c) illustrates luminance weight values of sub-region blocks for an upper side face, FIG. 4(d) illustrates luminance weight values of the sub-region blocks for a lower and front side face.

DETAILED DESCRIPTION

The technical solution of the application will be described in detail with reference to the drawings of embodiments of the present application. Obviously, the embodiments described are only some instead of all of the embodiments of the present application. All other embodiments obtained by those of ordinary skills in the art based on the embodiments herein without any creative efforts are within the scope of the present application.

To improve the accuracy of the luminance value of a region of interest, embodiments of the present application provide a method and apparatus for calculating a luminance value of a region of interest, an electronic device, and a computer readable storage medium. A method for calculating a luminance value of the region of interest according to an embodiment of the present application will be described below.

Figure 1:
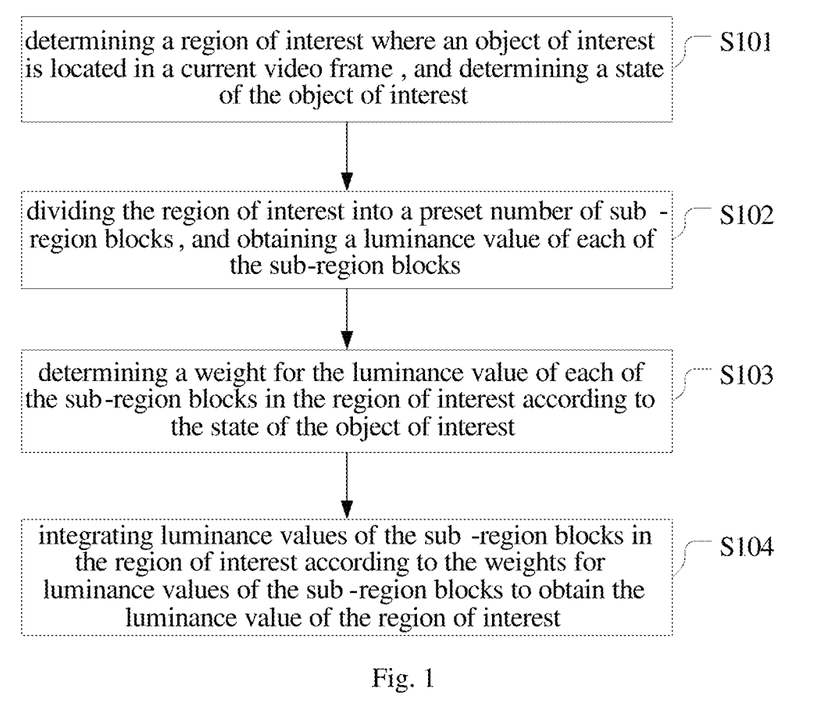
FIG. 1 is a flowchart of a method for calculating a luminance value of a region of interest according to an embodiment of the present application.

As shown in FIG. 1, a method for calculating a luminance value of a region of interest according to an embodiment of the present application includes the following operations.

At S101, a region of interest where an object of interest is located in a current video frame is determined, and a state of the object of interest is determined, The object of interest may be a surveillance object such as a face or a license plate. A region of in the video frame that contains the object of interest is a region of interest. In one implementation, the region of interest where the object of interest is located in the video frame may be detected by an image recognition algorithm such as face recognition or license plate recognition.

It is noted that the object of interest may be moving during the surveillance process, and the object of interest may be in different states in video frames. In an example, the object of interest is a human face. The states of the face may include a front face or a side face. The side face may be a left face, a right face, an upper face, or a lower face. In one implementation, the state of the object of interest may be determined by a preset classification model, having categories include, for example, a front face, a left face, a right face, an upper face, and a lower face. The training process of the classification model is known in the prior art, and is thus not described here.

In one implementation, the movement direction of the object of interest may be determined and the state of the object of interest may be determined based on the determined movement direction.

Specifically, the movement direction of the object of interest described above may be interpreted to be the direction in which the object of interest moves relative to the video acquisition device.

Continuing the example of a human face, the analysis of movement directions of faces and states of faces in video frames acquired by a video acquisition device provides the following fact:

When the face is moving toward the video acquisition device, the state of the face is a front face;

When the face is moving toward the left side of the video acquisition device, the state of the face is a left face;

When the face is moving toward the right side of the video acquisition device, the state of the face is a right face.

In summary, it may be known that the movement directions of the object of interest correspond with the states of the object of interest. Therefore, in one implementation of the present application, the correspondences between the movement directions and the states may be preset. When the state of the object of interest is determined based on the determined movement direction, the correspondence for the determined movement direction may be looked up in the above-mentioned preset correspondences and the state in the correspondence is taken as the state of the object of interest.

It should be noted that the embodiment of the present application only illustrates an example of the relationship between the movement direction of the object of interest and the state of the object of interest. Embodiments are not limited in this aspect.

Specifically, the movement direction of the object of interest may be determined according to the positions of the object of interest relative to the video acquisition device in the current video frame and in a preset number of frames previous to the current frame. For example, the positions of the object of interest relative to the video acquisition device in the current video frame and in 5 frames previous to the current video frame are determined. Based on the change in positions of the object of interest in the 6 frames, the movement direction of the object of interest relative to the video acquisition device can be determined. Continuing with the example of human face, if the face is moving toward the front side of the video capture device, the state of the object of interest is a front face, and if the face is moving toward the left side of the video acquisition device, the state of the object of interest is a left face.

At S102, the region of interest is divided into a preset number of sub-region blocks, and a luminance value of each of the sub-region blocks is obtained.

Figure 2:
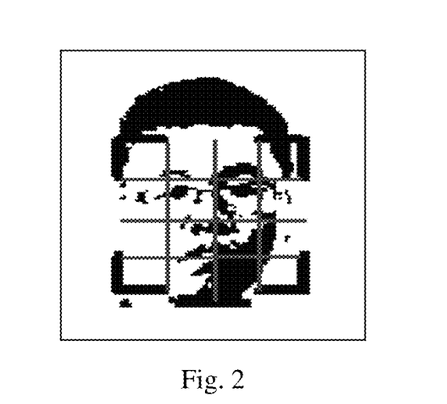
FIG. 2 is a schematic diagram of dividing a region of interest into sub-region blocks for an object of interest of a human face according to an embodiment of the present application.

In one implementation, a region of interest may be divided, regardless of the size thereof, into the same number of sub-region blocks. As shown in FIG. 2, the object of interest is a human face, and the recognition box is the region of interest. The region of interest is divided into 16 sub-region blocks. The luminance value of each of sub-region blocks may be the average of the luminance values of all the pixels in the sub-region block. Of course, regions of interest may be divided into different numbers of sub-region blocks, as a function of the sizes of the regions. For example, a region of interest having a size greater than a preset value may be divided into 16 sub-region blocks, and a region having a size smaller than the preset value is divided into 8 sub-region blocks.

At S103, a weight for the luminance value of each of sub-region blocks in the region of interest is determined according to the state of the object of interest.

Figure 3:
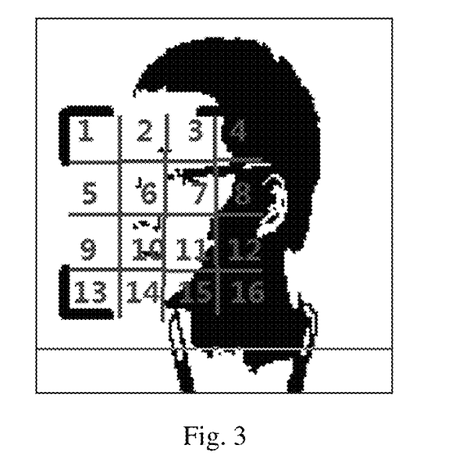
FIG. 3 is a schematic diagram of dividing a region of interest into sub-region blocks for a region of interest of a left side face according to an embodiment of the present application.

It may be understood that, the degree of influence the luminance value of each sub-region block in the region of interest has over the overall luminance value of the region of interest may depend on the state of the object of interest. As shown in FIG. 3, the object of interest corresponding to the region of interest is a left face. It may be understood that the blocks of the sub-region blocks 1, 5, 9, and 13 are not luminance blocks of the face region. If the luminance values of these four sub-region blocks are counted in the calculation of the overall luminance value of the region of interest, an inaccurate luminance value of the region of interest may be produced. In addition, the luminance values of sub-region blocks 2, 6, and 7 have different degrees of influence on the luminance value of the region of interest, as they are at different positions of the human face. Therefore, the luminance values of the sub-region blocks in the region of interest are assigned with different weight values. This may make the calculation of the luminance value of the region of interest obtained more accurate.

Specifically, a weight for the luminance value of each of sub-region blocks in the region of interest is determined according to preset correspondences between states of the object of interest and weights for luminance values of the sub-region blocks in the region of interest, and the state of the object of interest.

Figure 4:
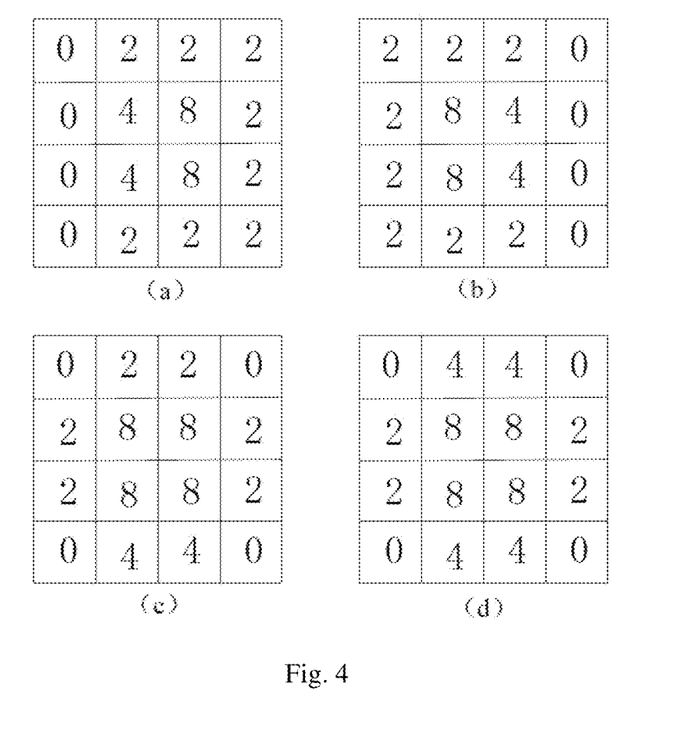

Continuing with the example of human face, the weights for luminance values of the sub-region blocks in the region of interest for different side faces are shown in FIG. 4. FIG. 4(a) illustrates weights for luminance values of sub-region blocks for a left face. FIG. 4(b) illustrates weights for luminance values of sub-region blocks for a right face. FIG. 4(c) illustrates weights for luminance values of sub-region blocks for an upper side face. FIG. 4(d) illustrates weights for luminance values of sub-region blocks for a lower and front face.

Specifically, in the example of the weighs for the luminance values shown in FIG. 4(a), the weights for luminance values of the sub-region blocks 1, 5, 9, and 13 are 0, and the weights for luminance values of the sub-region blocks 2, 3, 4, 8, 12, 14, 15, 16 are 2/40. The weights for luminance values of the sub-region blocks 6, 10 are 4/40. The weights for luminance values of the sub-region blocks 7, 11 are 8/40.

At S104, luminance values of the sub-region blocks in the region of interest are integrated according to the weights for luminance values of the sub-region blocks to obtain the luminance value of the region of interest.

Specifically, the luminance value of the region of interest is the weighted sum of the luminance values of the sub-region blocks in the region of interest.

Therefore, in embodiments of the present application, the state of the object of interest corresponding to the region of interest is taken into account; the region of interest is divided into a plurality of sub-region blocks; and a weight is assigned to the luminance value of each of the sub-region blocks based on the state of the object of interest. This can produce a more accurate luminance value of the region of interest.

In one implementation, in order to improve the exposure effect of the region of interest, after obtaining the luminance value of a region of interest, the average luminance value of regions of interest in the current video frame may also be calculated such that the exposure parameter for a video frame subsequent to the current video frame can be adjusted.

Specifically, in case of a single region of interest, the luminance value of the region of interest, once calculated, may be taken as the average luminance value of regions of interest in the current video frame. Then, the exposure parameter for a subsequent video frame can be adjusted according to the average luminance value of the regions of interest in the current video frame.

In case of more than one regions of interest, the average luminance value of the regions of interest in the current video frame may be calculated according to the luminance values of all the regions of interest as calculated. Then, the exposure parameter for a subsequent video frame of the current video frame may be adjusted according to the average luminance value of the regions of interest in the current video frame.

It may be understood that, for the second case, after obtaining the luminance value of each of the regions of interest, the average luminance value of the regions of interest in the current video frame may be calculated as an average of all the luminance values as obtained.

In one implementation, if there are many regions of interest in the video frame (such as a crowded small), the degrees of influence that the luminance values of different regions of interest have on the average luminance value of the regions of interest in the current video frame are different. A luminance value of a region of interest having a small influence on the average luminance value of the regions of interest in the current video frame does not have to be counted in the calculation of the average luminance value.

Therefore, before calculating the average luminance value of the regions of interest of the current video frame according to the luminance values of all the regions of interest, the method may further include: performing regional evaluation on each of the regions of interest to determine the degree of influence that the luminance value a region of interest has on the average luminance value of the regions of interest; and according to the determined degree of influence the luminance value of each of the regions of interest has on the average luminance value of the regions of interest, determining the region of interest with a high degree of influence as a region of interest of a first type.

Specifically, the above-mentioned regional evaluation on each region of interest may be based on the size of the region of interest and the state of an object of interest. It may be understood that the larger the region of interest, the greater the influence it has on the average luminance value of the regions of interest. Compared with a side face, a front face has a greater degree of influence on the average luminance value of the regions of interest. The degree of influence of the luminance value of a region has on the average luminance value of the regions of interest varies with the degree of inclination of the face.

For example, degree of influence posed by a region of interest having a size in a range may be different from that of another region having a size in another range. In addition, the degree of influence a region of interest has may also depend on the state of a corresponding object of interest. Then, in regional evaluation on any region of interest, the size of the region of interest and the state of the object of interest are determined. According to the above evaluation rule, the degree of influence that the luminance of a region of interest has on the average luminance value of the regions of interest is determined. This evaluation rule is also referred to as a scoring mechanism.

In one implementation, a region of interest that has a degree of influence on the average luminance value of the regions of interest greater than a certain threshold may be determined as a region of interest of a first type. It is also possible to determine a preset number of regions of interest that have a greater degree of influence on the average luminance value of the regions of interest as regions of interest of the first type.

Correspondingly, calculating the average luminance value of the regions of interest in the current video frame may include: calculating the average luminance value of the regions of interest in the current video frame according to the luminance values of the regions of interest of the first type.

In one implementation, the average luminance value of the regions of interest in the current video frame may be calculated as the average of the luminance values of all the regions of interest of the first type.

In another implementation, as the degrees of influence luminance the values of regions of interest of the first type have on the average luminance value of the regions of interest are different, in order to calculate a more accurate average luminance value of the regions of interest, different weight values may be assigned to the regions of interest of the first type. For example, different weights are assigned to regions of interest of the first type, if values of degree of influence these regions have on the average luminance value are in different ranges. The greater the degree of influence, the greater a weight value is assigned to the region of interest of the first type.

Therefore, calculating the average luminance value of the regions of interest in the current video frame according to the luminance values regions of interest of the first type may include: determining a weight value for each of the regions of interest of the first type according to a degree of influence the luminance value of each of the regions of interest of the first type has on the average luminance of the regions of interest; and calculating the average luminance value of the regions of interest in the current video frame according to the luminance value of and the weight value for each of the region of interest of the first type.

Specifically, the average luminance value of the regions of interest is equal to the weighted sum of the luminance values of regions of interest of the first type.

It may be seen that, in the embodiment of the present application, in the integration of the luminance values of regions of interest, the luminance values of recognized regions of interest are weighted and a scoring mechanism is introduced for the degrees of influence the luminance values of the regions of interest have on the average luminance of the regions of interest. Therefore, regions of interest are properly selected for luminance integration. In the calculation of the average luminance value of the regions of interest, the weighting process according to the result of the scoring mechanism can give a more accurate result of the average luminance value of the regions of interest.

The following describes the operations of adjusting an exposure parameter for a frame subsequent to the current video frame according to the average luminance value of the regions of interest in the current video frame in the above two cases.

Specifically, a determination can be made as to whether the absolute value of the difference between the average luminance value of the regions of interest in the current video frame and the preset reference luminance value is less than a preset exposure error value. If so, the exposure parameter for the subsequent video frame is directly determined to be equal to the exposure parameter for the current video frame; and if not, the exposure parameter for the subsequent video frame is adjusted according to the average luminance value of the regions of interest in the current video frame.

The calculation formula of the preset exposure error value y_ref_range may be: y_ref_range=local_y*(chg_range−1)/((1+chg_range)+0.5); Where chg_range is a parameter related to the number of adjustment steps of the exposure, and may be set to 1.2, and local_y represents the average luminance value of the regions of interest.

In one implementation, in the adjustment of the exposure parameter for the subsequent video frame according to the average luminance value of the regions of interest in the current video frame, the average luminance value of the regions of interest and the preset reference luminance value may be input to a preset exposure algorithm, such that an exposure parameter for the subsequent video frame is calculated. The luminance of the subsequent video frame can be adjusted through the adjustment of an aperture, a shutter and a gain. The preset exposure algorithm may be AE (Auto Exposure) exposure algorithm or other exposure algorithm.

It can be seen from the above that, in the solution provided by the embodiment of the present application, the state of the object of interest in a region of interest is considered. Each region of interest is divided into several sub-region blocks, and a weight value for the luminance of each of the sub-region blocks is assigned based on the state of an object of interest. In this way, the luminance value of each of regions of interest as calculated is more accurate, and thus the calculated average luminance value of the regions of interest in the current video frame is more accurate. Then, the exposure parameter for the subsequent video frame can be adjusted according to the average luminance value of the regions of interest in the current video frame. This may improve the exposure effect of the regions of interest in the subsequent video frame.

It may be understood that, a scene may change between the current video and the previous frame during the surveillance process. A scene in the current video frame may be a stable scene, a sudden change of luminance scene, or a normal exposure scene. Therefore, the exposure parameter for the subsequent video frame can be adjusted in different manners for different scene modes. The adjustment is thus scene-specific and has stronger scene self-adaptability. The scene is in a stable scene if the average luminance value of the regions of interest in the current video frame is the same as the average luminance value of the regions of interest in the previous frame. The scene is in a sudden change of luminance scene if the difference between the average luminance value of the regions of interest in the current video frame and the average luminance value of the regions of interest in the previous frame is large due to sudden interference of external luminance or a sudden change in the movement direction of the object of interest. The scene is in a normal exposure scene if the average luminance value of the regions of interest in the current video frame and a preset number of frames previous to the current video frame is zero.

Therefore, in one implementation, adjusting the exposure parameter for the subsequent video frame according to the average luminance value of the regions of interest in the current video frame may include:

determining whether the average luminance value of the regions of interest in the current video frame is greater than a first preset threshold;

if the average luminance value is greater than the first preset threshold, determining whether the average luminance value of the regions of interest in the current video frame is equal to an average luminance value of the regions of interest in a video frame previous to the current video frame;

if equal to the average luminance value of the regions of interest in a video frame previous to the current video frame, updating an average luminance value of the regions of interest in historical frames according to the average luminance value of the regions of interest in the current video frame; and adjusting the exposure parameter for the subsequent video frame according to the updated average luminance value of the regions of interest in historical frames and a preset reference luminance value.

It may be understood that, theoretically, when there is no region of interest in a video frame, the average luminance value of the region of interests in the video frame is zero, so the first preset threshold may be set to zero. In fact, the first preset threshold may also be set to other values that are close to zero or to smaller value, such as 1, 10, etc. Embodiments are not limited in this aspect. In addition, the "preset reference luminance value" herein is a reference luminance value for the global luminance of the preset video frame.

An average luminance value of the regions of interest in the current video frame greater than the first preset threshold indicates that the current video frame includes an object of interest. Furthermore, the fact that the average luminance value of the regions of interest in the current video frame is equal to the average luminance value of the regions of interest in the previous video frame indicates that the scene from the previous video frame to the current video frame is stable. At this time, the average luminance value of the regions of interest in historical frames may be updated according to the average luminance value of the regions of interest in the current video frame. This is because the luminance values of different regions of interest are obviously different. To prevent frequent exposure adjustment, it is necessary to smooth the average luminance value of the regions of interest in historical frames.

Specifically, the average luminance value of the regions of interest in historical frames may be updated according to the following formula: yuv_history_y=yuv_history_y'×[(128.0−up_date_rate)+update_rate×yuv_cur_y)]/128.0; wherein, yuv_cur_y represents the average luminance value of the regions of interest in the current video frame, yuv_history_y represents updated average luminance value of the regions of interest in historical frames, yuv_history_y' represents pre-update average luminance value of the regions of interest in historical frames, and update_rate represents an update rate that depends on the average luminance value of the regions of interest in historical frames and the reference luminance value. The update rate represented by update_rate dictates the adjustment rate of the average luminance value of the regions of interest. The update_rate ranges from 0 to 128.

The updated average luminance value of regions of interest in historical frames and the preset reference luminance value may be fit into the AE exposure algorithm. The exposure parameter for the subsequent video frame is adjusted, and the aperture, shutter, gain are used to adjust the luminance of the subsequent video frame. The preset reference luminance value is a preset target luminance value of a video frame. In the embodiment, when the exposure parameter for the subsequent video frame is adjusted, not only the average luminance value of the regions of interest of historical frames but also the preset reference luminance value are considered, so that the exposure parameter is more accurate and the exposure effect is better.

In one implementation, in the case that the average luminance value of the regions of interest in the current video frame is determined to be equal to the average luminance value of the regions of interest in the previous video frame, a determination may also be made as to whether the luminance value of each of the regions of interest in the current video frame is the same as that in the previous video frame. If they are the same, an image luminance value of the current video frame is determined.

It may be understood that the determination that the luminance value of each of the regions of interest in the current video frame is the same as that in the previous video frame indicates that the regions of interest in the current video frame are the same as those in the previous video frame. That is, the object of interest is not moving (also referred to as motionless object).

In this case, adjusting the exposure parameter for the subsequent video frame according to the updated average luminance value of regions of interest in historical frames and a preset reference luminance value may include:

determining that the exposure parameter for a first preset number of frames subsequent to the current video frame is equal to the exposure parameter for the current video frame;

decreasing the preset reference luminance value if the image luminance value is not less than a preset upper limit of luminance value, and adjusting the exposure parameter for a first target video frame according to the decreased reference luminance value and the updated average luminance value of the regions of interest in historical frames, wherein the first target video frame is a frame subsequent to the last frame in the first preset number of frames;

increasing the preset reference luminance value if the image luminance value is not greater than a preset lower limit of luminance value, and adjusting the exposure parameter for the first target video frame according to the increased reference luminance value and the updated average luminance value of the regions of interest in historical frames; and adjusting the exposure parameter for the first target video frame according to the preset reference luminance value and the updated average luminance value of regions of interest in historical frames if the image luminance value is greater than the preset lower limit of luminance value and less than the preset upper limit of luminance value.

It may be seen that in the case that there is no moving object in the video frame, it is determined that the exposure parameter of the first preset number of frames after the current video frame is equal to the exposure parameter of the current video frame, that is, the scene is kept stable for a certain period of time. The relationship between the image luminance value and the preset luminance upper limit value and the luminance lower limit value is also determined. When the image luminance value is higher than the luminance upper limit value, it indicates that the luminance of the current video frame is large, and the image luminance value of the next video frame needs to be appropriately lowered. Therefore the preset reference luminance value is reduced to prevent the local region of the image from being overexposed, so that the object of interest cannot be detected; When the global luminance is lower than the lower limit of the luminance, it indicates that the luminance of the current video frame is small, and the image luminance value of the next video frame needs to be appropriately increased. Therefore, the preset reference luminance value is increased to prevent the local region of the image from being underexposed, so that the object of interest cannot be detected; When the image luminance value is between the luminance lower limit value and the luminance upper limit value, it indicates that the luminance of the current video frame is normal. Therefore, it is not necessary to modify the preset reference luminance value, and the exposure parameter of the first target video frame is directly modified according to the preset reference luminance value and the updated average luminance value of the region of interest of the historical frames. The size of the upper limit value of the luminance and the lower limit value of the luminance is related to the data accuracy of the exposure algorithm.

In one implementation, if the average luminance value of the regions of interest in the current video frame is not equal to the average luminance value of the regions of interest in the previous video frame, the method may further include:

determining whether the absolute value of a target difference is greater than a second preset threshold, wherein, the target difference is the difference between the average luminance value of the regions of interest in the current video frame and the average luminance value of the regions of interest in historical frames;

if the target difference is not greater than the second preset threshold, updating the average luminance value of the regions of interest in historical frames according to the average luminance value of regions of interest in the current video frame, and adjusting the exposure parameter for the subsequent current video frame according to the updated average luminance value of the regions of interest in historical frames and the preset reference luminance value; and if the difference is greater than a second preset threshold, determining that the exposure parameter for each of a second preset number of frames subsequent to the current video frame is equal to the exposure parameter for the current video frame, and updating the average luminance value of the regions of interest in historical frames according to the average luminance value of the regions of interest in the current video frame, and then adjusting the exposure parameter for a second target video frame according to the updated average luminance value of the regions of interest in historical frames and the preset reference luminance value. The second target video frame is a frame subsequent to the last frame in the second preset number of frames.

It may be understood that the determination that the absolute value of the target difference is greater than the second preset threshold indicates that the luminance of the scene changes suddenly. In this case, it is necessary to ensure that the exposure parameters are kept constant for a certain number of consecutive frames, that is, the exposure parameter for the second preset number of frames subsequent to the current video frame is determined to be equal to the exposure parameter for the current video frame to prevent the exposure adjustment from being too frequent and thus causing the image to shake and blur. The average luminance value of the regions of interest in historical frames is updated according to the average luminance value of the regions of interest in the current video frame. Then the exposure parameter for the second target video frame is adjusted according to the updated average luminance value of regions of interest in the historical frames and the preset reference luminance value. The determination that the absolute value of the target difference is not greater than the second preset threshold indicates that the luminance of the scene does not change suddenly. In this case, the average luminance value of the regions of interest in historical frames may be directly updated according to the average luminance value of the regions of interest, and the exposure parameter for the subsequent video frame is adjusted according to the updated average luminance value of regions of interest in the historical frames and the preset reference luminance value. The second preset threshold may be set according to the data precision of the exposure algorithm. For example, an empirical value of the second preset threshold may be 30, and an empirical value of the second preset number of frames may be 30 frames.

The first preset number of frames may be equal to or different from the second preset number of frames. Embodiments are not limited in this aspect.

In one implementation, if the average luminance value of the regions of interest in the current video frame is determined to be not greater than the first preset threshold, the method may further include:

determining whether the average luminance value of the regions of interest in each of a third preset number of frames previous to the current video frame is not greater than the first preset threshold;

if the average luminance value is not greater than the first preset threshold, determining an image luminance value of the current video frame; and when the image luminance value is not less than a preset upper limit of luminance value or not greater than a preset lower limit of luminance value, adjusting the exposure parameter for the subsequent video according to the image luminance value and the preset reference luminance value; and when the image luminance value is less than a preset upper limit of luminance value and greater than a preset lower limit of luminance value, the exposure parameter for the subsequent video frame is determined as being equal to the exposure parameter for the current video frame; and if the average luminance value is greater than the first preset threshold, determining the image luminance value of the current video frame, and adjusting the exposure parameter for the subsequent video according to the image luminance value and the preset reference luminance value.

It may be understood that the fact that the average luminance value of the regions of interest in the third preset number of previous frames is not greater than the first preset threshold indicates that there is no region of interest in the current video frame and the third preset number of previous frames, that is, the current video frame is in a normal exposure mode. At this point, it may be determined, according to the image luminance value of the current video frame, if the luminance of the current video frame is too dark (e.g. the image luminance value is not greater than the preset lower limit of luminance) or too bright (e.g. the image luminance value is not less than the preset upper limit of luminance). The image luminance value and the preset reference luminance value are input to a preset exposure algorithm, and the exposure parameter for the subsequent video frame is calculated. When the luminance of the current video frame is determined to be normal (e.g. the image luminance value is less than the preset upper limit of luminance value and greater than the preset lower limit of luminance value), the luminance for the subsequent video frame may not need to be adjusted. At this time, the exposure parameter for the subsequent video frame can be determined as being equal to the exposure parameter for the current video frame. If there is, in the third preset number of frames previous to the current video, a video frame having an average luminance of regions of interest greater than the first preset threshold frame, the image luminance value in the current video frame is determined, and the exposure parameter for the subsequent video frame is modified according to the image luminance value and the preset reference luminance value.

It may be seen that in the solutions provided by the embodiment of the present application, the scene in which the current video frame is located is divided, and the exposure parameter of the next video frame is determined according to different scene characteristics in a different manner, which is more targeted and has scene self-adaptability, thereby further improving the exposure effect.

Figure 5:
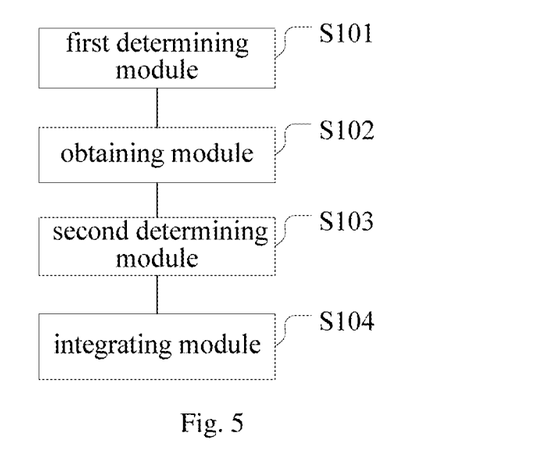
FIG. 5 is a structural schematic diagram of an apparatus for calculating a luminance value of a region of interest according to an embodiment of the present application.

In correspondence with the above-mentioned method for calculating a luminance value of a region of interest, embodiments of the present application provides a computing apparatus for the luminance value of the region of interest. Corresponding to the method embodiment shown in FIG. 1, FIG. 5 is a structural schematic diagram of an apparatus for calculating a luminance value of a region of interest according to an embodiment of the present disclosure. The apparatus may include a first determining module 501, an obtaining module 502, a second determining module 503 and an integrating module 504.

The first determining module 501 is configured for determining a region of interest where an object of interest is located in a current video frame, and determining a state of the object of interest.

The obtaining module 502 is configured for dividing the region of interest into a preset number of sub-region blocks, and obtaining a luminance value of each of the sub-region blocks.

The second determining module 503 is configured for determining, according to the state of the object of interest, a weight for the luminance value of each of the sub-region blocks in the region of interest.

The integrating module 504 is configured for integrating luminance values of the sub-region blocks in the region of interest according to the weights for luminance values of the sub-region blocks to obtain the luminance value of the region of interest.

In the solution provided by the embodiment of the present application, the state of the object of interest corresponding to the region of interest is considered, the region of interest is divided into several sub-region blocks, and a weight for luminance value is assigned to each sub-region block based on the state of the object of interest. This makes the calculated luminance value of the region of interest more accurate.

As a specific embodiment of the present application, the first determining module 501 may determines the state of the object of interest by:

determining a movement direction of the object of interest and determining the state of the object of interest based on the determined movement direction.

As a specific embodiment of the present application, the first determining module 501 determines the movement direction of the object of interest by:

determining the movement direction of the object of interest according to a position of the object of interest relative to a video acquisition device in the current video frame and positions of the object of interest relative to the device in a preset number of frames previous to the current video frame.

As a specific embodiment of the present application, the object of interest is a human face, and the state of the object of interest includes: a front face, a left face, a right face, an upper face, and a lower face.

As a specific embodiment of the present application, the second determining module 503 described above may be used for:

determining a weight for the luminance value of each of the sub-region blocks in the region of interest according to correspondences between preset states of the object of interest and weights for luminance values of the sub-region blocks in the region of interest, and the state of the object of interest.

As a specific embodiment of the present application, in case of a single region of interest, the apparatus may further include:

a first calculating module configured for after the luminance value of the region of interest is calculated, taking the calculated luminance value of the region of interest as an average luminance value of regions of interest in the current video frame; and an adjusting module configured for adjusting an exposure parameter for a video frame subsequent to the current video frame according to the average luminance value of regions of interest in the current video frame.

As a specific embodiment of the present application, if the current video frame contains more than one regions of interest, the apparatus may further include:

a second calculating module configured for, after a luminance value of each of the regions of interest is calculated, calculating an average luminance value of the regions of interest in the current video frame according to the luminance values of all the regions of interest, and then triggering the adjustment module.

As a specific embodiment of the present application, the apparatus may further include:

a third determining module, configured for, before the second calculating module calculates an average luminance value of the regions of interest in the current video frame according to the luminance values of all the regions of interest, performing a regional evaluation to determine a degree of influence that the luminance value of each of the regions of interest has on the average luminance value of regions of interest; and a fourth determining module, configured for determining a region of interest having a degree of influence higher than a preset threshold as a region of interest of a first type, according to the determined degree of influence that the luminance value of each of the regions of interest has on the average luminance value of the regions of interest.

The second calculating module may be further configured for: calculating the average luminance value of regions of interest in the current video frame according to the luminance values of all the regions of interest of the first type.

As a specific embodiment of the present application, the calculating sub-module may include:

a determining unit, configured for determining a weight value for each of the regions of interest of the first type according to a degree of influence the luminance value of each of the regions of interest of the first type has on the average luminance of the regions of interest; and a calculating unit, configured for calculating the average luminance value of the regions of interest in the current video frame according to the luminance value of and the weight value for each of the region of interest of the first type.

As a specific embodiment of the application, the adjusting module may include:

a first determining sub-module configured for determining whether the average luminance value of the regions of interest in the current video frame is greater than a first preset threshold;

a second determining sub-module configured for, if the average luminance value is greater than the first preset threshold, determining whether the average luminance value of the regions of interest in the current video frame is equal to an average luminance value of the regions of interest in a video frame previous to the current video frame;

an updating sub-module, configured for, if the average luminance value of the regions of interest in the current video frame is equal to the average luminance value of the regions of interest in a video frame previous to the current video frame, updating an average luminance value of the regions of interest in historical frames according to the average luminance value of the regions of interest in the current video frame; and a first adjusting sub-module, configured for adjusting the exposure parameter for the subsequent video frame according to the updated average luminance value of the regions of interest in historical frames and a preset reference luminance value.

As a specific embodiment of the present application, the apparatus may further include:

a third determining sub-module configured for, in case where the average luminance value of the regions of interest in the current video frame is determined to be equal to the average luminance value of the regions of interest in a video frame previous to the current video frame, for any object of interest in the current video frame, determining whether the luminance value of the region of interest where the object of interest is located in the current video frame is the same with the luminance value of the region of interest where the object of interest is located in the previous video frame;

a first determining sub-module, configured for, if, for any object of interest in the current video frame, the luminance value of the region of interest where the object of interest is located in the current video frame is determined to be the same with the luminance value of the region of interest where the object of interest is located in the previous video frame, determining an image luminance value of the current video frame.

Accordingly, the first adjusting sub-module may include:

a determining unit, configured for determining that the exposure parameter for a first preset number of frames subsequent to the current video frame is equal to the exposure parameter for the current video frame;

a first adjusting unit, configured for decreasing the preset reference luminance value if the image luminance value is not less than a preset upper limit of luminance value, and adjusting the exposure parameter for a first target video frame according to the decreased reference luminance value and the updated average luminance value of the regions of interest in historical frames, wherein the first target video frame is a frame subsequent to the last frame in the first preset number of frames;

a second adjusting unit, configured for increasing the preset reference luminance value if the image luminance value is not greater than a preset lower limit of luminance value, and adjusting the exposure parameter for the first target video frame according to the increased reference luminance value and the updated average luminance value of the regions of interest in historical frames; and a third adjusting unit, configured for adjusting the exposure parameter for the first target video frame according to the preset reference luminance value and the updated average luminance value of regions of interest in historical frames if the image luminance value is greater than the preset lower limit of luminance value and less than the preset upper limit of luminance value.

As a specific embodiment of the present application, the apparatus may also include:

a fourth determining sub-module configured for, if the average luminance value of the regions of interest in the current video frame is not equal to the average luminance value of the regions of interest in the previous video frame, determining whether the absolute value of a target difference is greater than a second preset threshold. The target difference is the difference between the average luminance value of the regions of interest in the current video frame and the average luminance value of the regions of interest in historical frames;

a second adjusting sub-module configured for, if the absolute value of the target difference is not greater than the second preset threshold, updating the average luminance value of the regions of interest in historical frames according to the average luminance value of regions of interest in the current video frame, and adjusting the exposure parameter for the subsequent current video frame according to the updated average luminance value of the regions of interest in historical frames and the preset reference luminance value; and a third adjusting sub-module configured for if the absolute value of the target difference is greater than a second preset threshold, determining the exposure parameter for each of a second preset number of frames subsequent to the current video frame as being equal to the exposure parameter for the current video frame, and updating the average luminance value of the regions of interest in historical frames according to the average luminance value of the regions of interest in the current video frame, and then adjusting the exposure parameter for a second target video frame according to the updated average luminance value of the regions of interest in historical frames and the preset reference luminance value. The second target video frame is a frame subsequent to the last frame in the second preset number of frames.

As a specific embodiment of the present application, the apparatus may further include:

a fifth determining sub-module configured for, if the average luminance value of the regions of interest in the current video frame is determined to be not greater than the first preset threshold, determining whether the average luminance value of the regions of interest in each of a third preset number of frames previous to the current video frame is not greater than the first preset threshold; and a fourth adjusting sub-module configured for, if the average luminance value of the regions of interest in each of a third preset number of frames previous to the current video frame is not greater than the first preset threshold, determining an image luminance value of the current video frame; and when the image luminance value is not less than a preset upper limit of luminance value or not greater than a preset lower limit of luminance value, adjusting the exposure parameter for the subsequent video frame according to the image luminance value and the preset reference luminance value; and when the image luminance value is less than a preset upper limit of luminance value and greater than a preset lower limit of luminance value, determining the exposure parameter for the subsequent video frame as being equal to the exposure parameter for the current video frame according to the image luminance value and the preset reference luminance value; and a fifth adjusting sub-module configured for, if not all the average luminance values of the regions of interest in the third preset number of frames previous to the current video frame are not greater than the first preset threshold, determining an image luminance value of the current video frame, and adjusting the parameter for the subsequent frame according to the image luminance value and the preset reference luminance value.

By running the computer program product provided by the embodiment of the present application, considering the state of the object of interest corresponding to the region of interest, the region of interest is divided into several sub-region blocks and each of the sub-region blocks is assigned a luminance weight value based on the state of the object of interest, thus making the calculated luminance value of the region of interest more accurate.

It should be noted that the relationship terms herein such as "first", "second" and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, for the embodiments of the apparatus, the electronic device, and the computer readable storage medium, since they are similar to the embodiments of the method, the description thereof is relatively simple; the relating parts could refer to the parts of the description of embodiments of the method.

Embodiments described above are just preferred embodiments of the present invention, and not intended to limit the scope of the present invention. Any modifications, equivalent, improvement or the like within the spirit and principle of the present disclosure should be included in the scope of the present disclosure.

The invention claimed is:

1. A method for calculating a luminance value of a region of interest, comprising:
   determining a region of interest where an object of interest is located in a current video frame, and determining a state of the object of interest, wherein the object of interest is a surveillance object and the state of the object of interest is an orientation of the surveillance object;
   dividing the region of interest into a preset number of sub-region blocks, and obtaining a luminance value of each of the sub-region blocks;
   determining a weight for the luminance value of each of the sub-region blocks in the region of interest according to correspondences between preset states of the object of interest and weights for luminance values of the sub-region blocks in the region of interest, and the state of the object of interest; wherein, an orientation of a human face corresponds to the preset number of weights for luminance values; and
   integrating luminance values of the sub-region blocks in the region of interest according to the weights for luminance values of the sub-region blocks to obtain the luminance value of the region of interest;
   wherein, if the current video frame contains more than one region of interest, the method further comprises:
   after a luminance value of each of the regions of interest is calculated, calculating an average luminance value of the regions of interest in the current video frame according to the luminance values of all the regions of interest; and
   adjusting an exposure parameter for a video frame subsequent to the current video frame according to the average luminance value of regions of interest in the current video frame;
   wherein, before calculating an average luminance value of the regions of interest in the current video frame according to the luminance values of all the regions of interest, the method further comprises:
   determining a degree of influence that the luminance value of each of the regions of interest has on the average luminance value of regions of interest; and
   determining a region of interest having a degree of influence higher than a preset threshold as a region of interest of a first type, according to the determined degree of influence that the luminance value of each of the regions of interest has on the average luminance value of the regions of interest;
   wherein, the average luminance value of regions of interest in the current video frame is calculated according to the luminance values of all the regions of interest of the first type.

2. The method of claim 1, wherein, determining a state of the object of interest comprises:
   determining a movement direction of the object of interest and determining the state of the object of interest based on the determined movement direction.

3. The method of claim 2, wherein, determining a movement direction of the object of interest comprises:
   determining the movement direction of the object of interest according to a position of the object of interest relative to a video acquisition device in the current video frame and positions of the object of interest relative to the device in a preset number of frames previous to the current video frame.

4. The method of claim 2, wherein, determining the state of the object of interest based on the determined movement direction comprises:
   looking up in correspondences between preset movement directions and states to obtain a correspondence containing the determined movement direction, and taking the state contained in the obtained correspondence as the state of the object of interest.

5. The method of claim 1, wherein, the object of interest is a human face, and the state of the object of interest is selected from a group comprising: a front face, a left face, a right face, an upper face, and a lower face.

6. The method of claim 1, wherein, if the current video frame contains a single region of interest, the method further comprises:
   after the luminance value of the region of interest is calculated, taking the calculated luminance value of the region of interest as an average luminance value of regions of interest in the current video frame; and adjusting an exposure parameter for a video frame subsequent to the current video frame according to the average luminance value of regions of interest in the current video frame.

7. The method of claim 1, wherein, determining a degree of influence that the luminance value of each of the regions of interest has on the average luminance value of regions of interest comprises:
   determining the degree of influence the luminance value of each of the regions of interest has on the average luminance value of regions of interest according to a size of the region of interest and a state of an object of interest.

8. The method of claim 1, wherein, calculating the average luminance value of the regions of interest in the current video frame according to the luminance values of all the regions of interest of the first type comprises:
   determining a weight value for each of the regions of interest of the first type according to a degree of influence the luminance value of each of the regions of interest of the first type has on the average luminance of the regions of interest; and
   calculating the average luminance value of the regions of interest in the current video frame according to the luminance value of and the weight value for each of the region of interest of the first type.

9. The method of claim 8, wherein, determining a weight value for each of the regions of interest of the first type according to a degree of influence the luminance value of each of the regions of interest of the first type has on the average luminance of the region of interest comprises:
   determining a weight value corresponding to a range in which a value of the degree of influence that the luminance value of each of the regions of interest of the first type has on the average luminance value of the regions of interest as the weight value for each of the regions of interest of the first type, according to correspondences between ranges in which values of degrees of influence that the preset luminance values of the regions of interest have on the average luminance of the regions of interest and the weight values of the regions of interest of the first type.

10. The method of claim 6, wherein, adjusting an exposure parameter for a frame subsequent to the current video frame according to the average luminance value of the regions of interest in the current video frame comprises:
   determining whether the average luminance value of the regions of interest in the current video frame is greater than a first preset threshold;
   if the average luminance value is greater than the first preset threshold, determining whether the average luminance value of the regions of interest in the current video frame is equal to an average luminance value of the regions of interest in a video frame previous to the current video frame;
   if the average luminance value of the regions of interest in the current video frame is equal to the average luminance value of the regions of interest in a video frame previous to the current video frame, updating an average luminance value of the regions of interest in historical frames according to the average luminance value of the regions of interest in the current video frame; wherein the historical frames comprise at least one video frame previous to the current video frame; and
   adjusting the exposure parameter for the subsequent video frame according to the updated average luminance value of the regions of interest in historical frames and a preset reference luminance value.

11. The method of claim 10, wherein, in case where the average luminance value of the regions of interest in the current video frame is determined to be equal to the average luminance value of the regions of interest in a video frame previous to the current video frame, before adjusting the exposure parameter for the subsequent video frame according to the updated average luminance value of the regions of interest in historical frames and a preset reference luminance value, the method further comprises:
   for any object of interest in the current video frame, determining whether the luminance value of the region of interest where the object of interest is located in the current video frame is the same with the luminance value of the region of interest where the object of interest is located in the previous video frame;
   if so, determining an image luminance value of the current video frame;
   adjusting the exposure parameter for the subsequent video frame according to the updated average luminance value of regions of interest in historical frames and a preset reference luminance value comprises:
   determining that the exposure parameter for a first preset number of frames subsequent to the current video frame is equal to the exposure parameter for the current video frame;
   decreasing the preset reference luminance value if the image luminance value is not less than a preset upper limit of luminance value, and adjusting the exposure parameter for a first target video frame according to the decreased reference luminance value and the updated average luminance value of the regions of interest in historical frames, wherein the first target video frame is a frame subsequent to the last frame in the first preset number of frames;
   increasing the preset reference luminance value if the image luminance value is not greater than a preset lower limit of luminance value, and adjusting the exposure parameter for the first target video frame according to the increased reference luminance value and the updated average luminance value of the regions of interest in historical frames; and
   adjusting the exposure parameter for the first target video frame according to the preset reference luminance value and the updated average luminance value of regions of interest in historical frames if the image luminance value is greater than the preset lower limit of luminance value and less than the preset upper limit of luminance value.

12. The method of claim 11, wherein, if the average luminance value of the regions of interest in the current video frame is not equal to the average luminance value of the regions of interest in the previous video frame, the method further comprises:
   determining whether the absolute value of a target difference is greater than a second preset threshold, wherein, the target difference is the difference between the average luminance value of the regions of interest in the current video frame and the average luminance value of the regions of interest in historical frames;
   if the absolute value of the target difference is not greater than the second preset threshold, updating the average luminance value of the regions of interest in historical frames according to the average luminance value of regions of interest in the current video frame, and adjusting the exposure parameter for the subsequent current video frame according to the updated average luminance value of the regions of interest in historical frames and the preset reference luminance value;

if the absolute value of the target difference is greater than a second preset threshold, determining the exposure parameter for each of a second preset number of frames subsequent to the current video frame as being equal to the exposure parameter for the current video frame, and updating the average luminance value of the regions of interest in historical frames according to the average luminance value of the regions of interest in the current video frame, and then adjusting the exposure parameter for a second target video frame according to the updated average luminance value of the regions of interest in historical frames and the preset reference luminance value, wherein the second target video frame is a frame subsequent to the last frame in the second preset number of frames.

13. The method of claim 10, wherein, if the average luminance value of the regions of interest in the current video frame is determined to be not greater than the first preset threshold, the method further comprises:
determining whether the average luminance value of the regions of interest in each of a third preset number of frames previous to the current video frame is not greater than the first preset threshold; and
if the average luminance value is not greater than the first preset threshold, determining an image luminance value of the current video frame, and when the image luminance value is less than a preset upper limit of luminance value and greater than a preset lower limit of luminance value, determining the exposure parameter for the subsequent video frame as being equal to the exposure parameter for the current video frame according to the image luminance value and the preset reference luminance value.

* * * * *